United States Patent
Adams, Jr. et al.

(10) Patent No.: US 6,573,932 B1
(45) Date of Patent: Jun. 3, 2003

(54) METHOD FOR AUTOMATIC WHITE BALANCE OF DIGITAL IMAGES

(75) Inventors: James E. Adams, Jr., Rochester, NY (US); John F. Hamilton, Jr., Rochester, NY (US); Edward B. Gindele, Rochester, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/099,835

(22) Filed: Mar. 15, 2002

(51) Int. Cl.$^7$ ................................................ H04N 9/73
(52) U.S. Cl. ................ 348/224.1; 348/223.1; 348/225.1
(58) Field of Search ............. 348/224.1, 225.1, 348/228.1, 234, 237, 655, 223.1, 222.1; 382/162, 167

(56) References Cited

U.S. PATENT DOCUMENTS

| | | | | |
|---|---|---|---|---|
| 5,481,302 A | * | 1/1996 | Yamamoto et al. | 348/223.1 |
| 5,644,358 A | * | 7/1997 | Miyano et al. | 348/223.1 |
| 5,805,213 A | * | 9/1998 | Spaulding et al. | 348/222.1 |

* cited by examiner

Primary Examiner—Wendy R. Garber
Assistant Examiner—Justin Misleh
(74) Attorney, Agent, or Firm—Raymond L. Owens

(57) ABSTRACT

A white balance correction method for a digital imaging device, including determining a scene illuminant type from a scene brightness and one or more color coordinate values; determining a white balance parameter value responsive to the scene illuminant type, the scene brightness, and one or more color coordinate values; providing at least one white balance correction curve; determining the white balance correction from the white balance parameter value and at least one white balance correction curve for the determined scene illuminant type.

7 Claims, 4 Drawing Sheets

METHOD FOR AUTOMATIC WHITE BALANCE OF DIGITAL IMAGES

CROSS REFERENCE TO RELATED APPLICATION

Reference is made to commonly-assigned U.S. patent application Ser. No. 09/567,641 filed May 9, 2000, entitled "Auto White Balancing Apparatus and Method", by Toshiki Miyano the disclosure of which is incorporated herein.

FIELD OF INVENTION

The present invention relates to providing for detection of scene illuminant and the use thereof to provide white balance correction in the digital photographic process.

BACKGROUND OF THE INVENTION

To perform like the human visual system, imaging systems must automatically adapt to changing color casts in scene illumination. Simply put, white objects in a scene must be rendered as white, regardless of whether the scene illuminant was daylight, tungsten, fluorescent, or some other source. This process of automatic white adaptation is called "white balancing" and the corrective action determined by this adaptation mechanism is the white balance correction.

Automatic white balance algorithms employed in automatic printers, digital scanners, and digital cameras conventionally employ the digitized image information and related mathematical techniques to attempt to deduce from the image data the optimum level of white balance correction to be applied on a scene-by-scene basis to the image. It is known that errors in automatic white balance correction occur when the algorithm is unable to differentiate between an overall color cast caused by the scene illuminant and an overall color bias due to the composition of the scene. It is desirable, therefore, to be able to differentiate a color cast due to scene illumination from a color bias due to scene composition. It is also known that white balance errors occur due to color temperature variations within a class of scene illuminant. Late day direct sunlight imposes a yellowish color cast to a scene while skylight on a cloudy day will lend a bluish color cast to a scene. However, both lights are clearly daylight and will require substantially different white balance corrections. It is desirable, therefore, to also be able to account for scene illuminant color temperature variation when determining the white balance correction.

There are many methods described in the literature for determining the scene illuminant of a digital image. Some require special hardware at the time of image capture to make this determination. In commonly-assigned U.S. Pat. Nos. 4,827,119 and 5,037,198 a method of measuring scene illuminant temporal oscillations with the use of a dedicated sensor is described. Daylight will have no oscillation, while tungsten and fluorescent sources will fluctuate in output power due to the AC nature of their power supplies. The problem with any dedicated sensor approach is that it consists of two separate data collection and processing paths, one for illuminant detection and another for actual image capture. This leads to the potential of the dedicated sensor path losing synchronization and calibration with respect to the main image capture path. Additionally, the relatively limited amount of information captured by a dedicated sensor can severely limit the robustness of the scene illuminant determination. In commonly-assigned U.S. Pat. Nos. 5,644,358 and 5,659,357 the image data (video input) is combined with a luminance input to perform illuminant classification. (The nature of the luminance input is never described.) Rather than determining an overall illuminant for the scene, a low resolution version of the image is created and each image element (or "paxel") within the low resolution image is individually classified into one of a number of possible scene illuminants. Statistics are performed on these paxel classifications to derive a best compromise white balance correction. The problem with this approach is that no explicit attempt is made to uncouple the effects of scene illuminant color cast from the effects of scene composition. Instead, a complex series of tests and data weighting schemes are applied after the paxel classifications to try and reduce subsequent algorithm errors. Japanese Patent JP2001211458 teaches a method very similar to that described in commonly-assigned U.S. Pat. Nos. 5,644,358 and 5,659,357, and has the same problems. In commonly-assigned U.S. Pat. No. 6,133,983 scene-specific measurements of the scene light level, camera-to-subject distance, flash fire signal, and flash return signal are used to classify an image as being captured either under daylight or non-daylight illuminant. It is stated that for images captured with daylight-balanced films there is no need to further distinguish the non-daylight illuminants because the same white balance correction methodology works regardless. As a result, commonly-assigned U.S. Pat. No. 6,133,983 does not present a method for such subsequent illuminant discrimination. The problems with this approach are that it fails if applied to imaging systems requiring further differentiation of non-daylight sources for accurate white balancing, or if any of the image metadata (i.e., scene light level, camera-to-subject distance, flash fire signal, and flash return signal) are corrupt or missing.

There are many methods described in the literature for determining a color temperature responsive white balance correction of a digital image. In commonly-assigned U.S. Pat. Nos. 5,185,658 and 5,298,980 a method of measuring the scene illuminant's relative amounts of red (R), green (G), and blue (B) power with dedicated sensors is described. The white balance correction values are derived from the ratios of R/G and B/G which are considered to be related to the color temperature of the scene illuminant. As with commonly-assigned U.S. Pat. Nos. 4,827,119 and 5,037,198, discussed above, the problem with any dedicated sensor approach is that it consists of two separate data collection and processing paths, one for illuminant detection and another for actual image capture, and these two paths can get "out of step" with each other. In the above referenced JP200121458 the illuminant classification step is further refined to represent a variety of subcategories within each illuminant class. In this way cooler and warmer color cast versions of the illuminant classes of daylight, tungsten, and fluorescent are determined. However, as stated before, there is no explicit method given for uncoupling illuminant color cast from scene composition variability and, as a result, a variety of involved statistical operations are required in an attempt to minimize algorithmic errors.

SUMMARY OF THE INVENTION

It is therefore the object of the present invention to provide a simplified means for detecting and discriminating scene illuminants for use in computing white balance corrections and for the white balance corrections to be responsive to color temperature variations within each class of scene illuminants.

This object is achieved in a white balance correction method for a digital imaging device, comprising:

(a) determining a scene illuminant type from a scene brightness and one or more color coordinate values;

(b) determining a white balance parameter value responsive to the scene illuminant type, the scene brightness, and one or more color coordinate values;

(c) providing at least one white balance correction curve; and (d) determining the white balance correction from the white balance parameter value and the white balance correction curve for the determined scene illuminant type.

It is an advantage of the present invention to provide a way of detecting and discriminating scene illuminants to effectively make white balance corrections.

Another advantage of the present invention is to provide an improved and simplified arrangement for providing white balance corrections.

BRIEF DESCRIPTIONS OF THE DRAWINGS

DETAILED DESCRIPTION OF THE INVENTION

Since electronic cameras are well known, the present description will be directed in particular to elements forming part of, or cooperating more directly with, apparatus and methods in accordance with the present invention. Elements not specifically shown or described herein can be selected from those known in the art.

Figure 1:
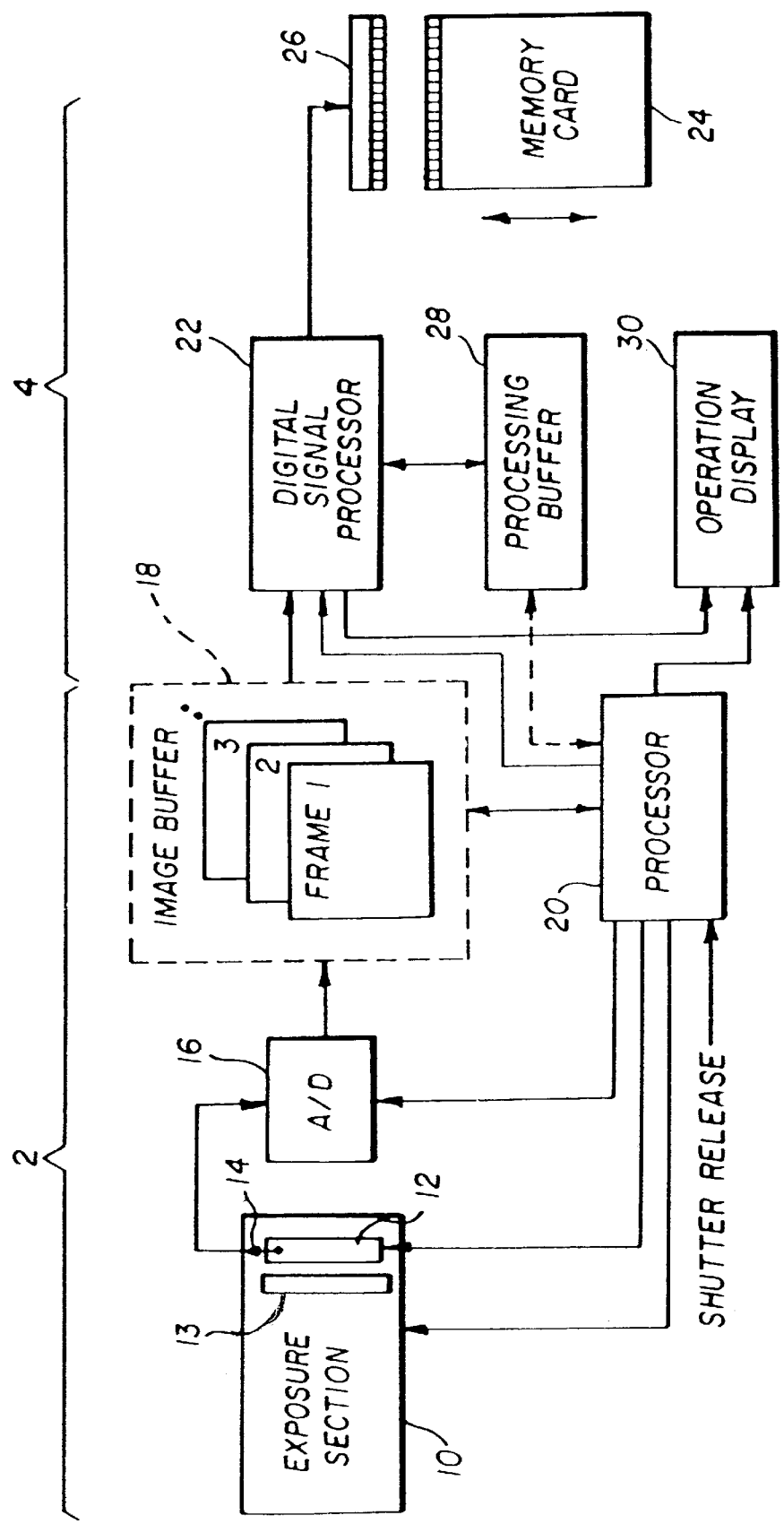
FIG. 1 is a block diagram of an electronic camera that can be used in accordance with the present invention.

Referring initially to FIG. 1, an electronic still camera is divided generally into an input section 2 and an interpolation and recording section 4. It will be understood that the present invention can be used in other image capture devices. The input section 2 includes an exposure section 10 for directing image light from a subject (not shown) toward an image sensor 12. Although not shown, the exposure section 10 includes conventional optics for directing the image light through a diaphragm, which regulates the optical aperture, and shutter, which regulates exposure time. The image sensor 12, which includes a two-dimensional array of photosites corresponding to picture taking elements of the image, is a conventional charge-coupled device (CCD) or complementary metal-oxide silicon (CMOS) sensor.

The present invention begins by acquiring linear red, green, and blue (RGB) image data from the image sensor 12. The data can be a complete RGB image, or it can be data from a color filter array (CFA) 13, known as the Bayer array, which is described in commonly-assigned U.S. Pat. No. 3,971,065 the disclosure of which is incorporated herein by reference. In the Bayer geometry each color covers a photosite, or picture element (pixel), of the image sensor 12. The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog image signal for each picture element. The digital signals are applied to an image buffer 18, which can be a random access memory (RAM) with storage capacity for a plurality of images.

A control processor 20 generally controls the input section 2 of the camera by initiating and controlling exposure (by operation of the diaphragm and shutter (not shown) in the exposure section 10), by generating the horizontal and vertical signals required to access the image data in the image sensor 12, and by enabling the A/D converter 16 in conjunction with the image buffer 18 for each signal segment relating to a picture element. Once a certain number of digital image signals have been accumulated in the image buffer 18, the stored signals are applied to a digital signal processor 22, which controls the throughput processing rate for the interpolation and recording section 4 of the camera. In addition, the control processor 20 transmits photographic information to the digital signal processor 22, including camera settings such as shutter speed, aperture, and exposure index. The digital signal processor 22 applies the appropriate image processing algorithms (such as white balance, interpolation, and color correction) to the digital image signals and sends the image signals to a conventional, removable memory card 24 via connector 26.

Since image processing ordinarily occurs over several steps, the intermediate products of the processing algorithm are stored in a processing buffer 28. (The processing buffer 28 can also be configured as part of the memory space of the image buffer 18.) The number of image signals needed in the image buffer 18 before digital processing can begin depends on the type of processing, that is, for the white balance operation to begin, a block of signals including at least a portion of the image signals comprising a video frame must be available. Consequently, in most circumstances, the white balance operation can commence as soon as the requisite block of picture elements is present in the image buffer 18.

An operation display panel 30 is connected to the control processor 20 for displaying information useful in the operation of the camera. Such information might include typical photographic data, such as shutter speed, aperture, exposure bias, and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

Figure 2:
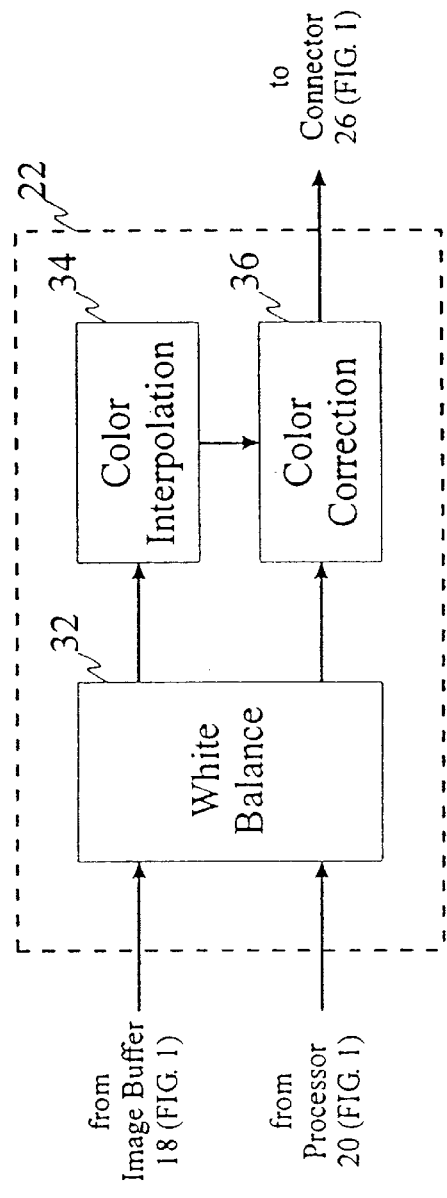
FIG. 2 shows in more detail a block diagram of block 22 in FIG. 1.

Referring to FIG. 2, a digital signal processor block 22 is described in greater detail. A white balance block 32 accepts unprocessed image data from the image buffer block 18 and classifies the scene illuminant (the light source in use when the image was captured) and determines the proper white balance gains. In digital camera systems, it is common practice that neutral colors (i.e. white, black, and shades of gray) be represented by red, green, and blue (RGB) data values that are equal to each other. When this condition holds, the image is said to be white balanced. However, it is typical that (raw) unprocessed image data from a camera sensor is not white balanced, thus the red, green, and blue data values for neutral colors are not equal to each other. In this case, white balance is achieved by multiplying the RGB data values by different numbers: the red values by a red gain, the green values by a green gain, and the blue values by a blue gain. If the gains are selected properly, the result is that neutral colors have equal RGB values and white balance is achieved. A color interpolation block 34 creates a full three-color image from the white balanced image data created in block 32. Methods of color interpolation are well known (see, for example, commonly-assigned U.S. Pat. No. 5,652,621) for such color filter arrays as the Bayer pattern (commonly-assigned U.S. Pat. No. 3,971,065). A color correction block 36 adjusts the RGB data values by the application of a color correction matrix which is selected according to the scene illuminant classification as determined in the white balance block 32.

Figure 3:
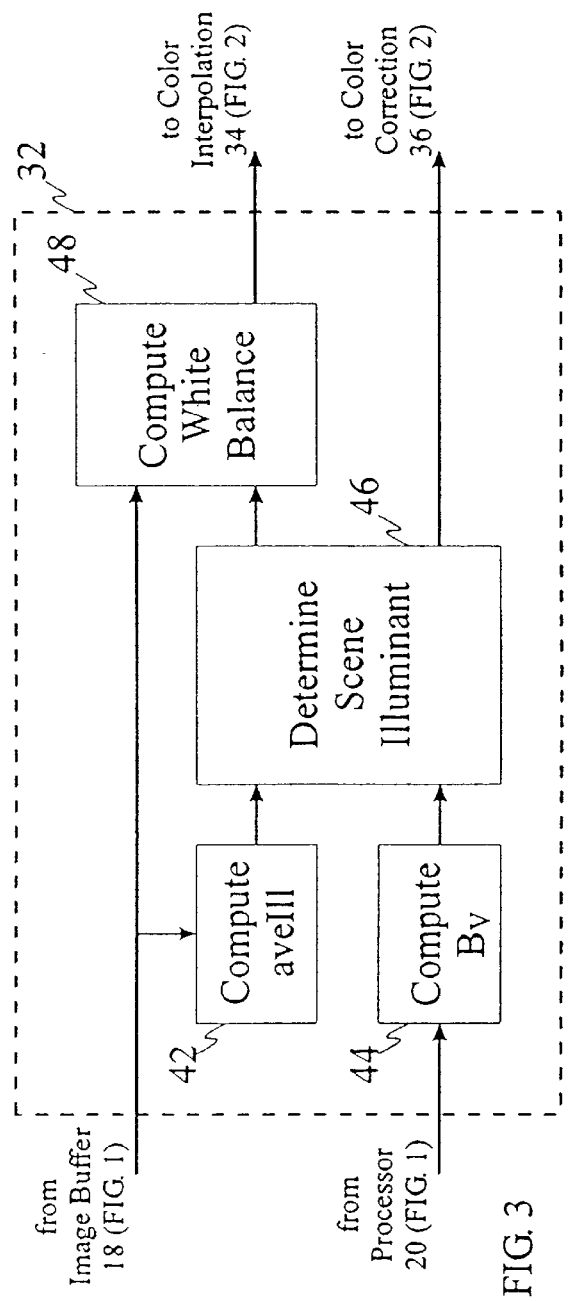
FIG. 3 shows in more detail a block diagram of block 32 in FIG. 2.

Referring to FIG. 3, the white balance block 32 is described in greater detail. A compute aveIll block 42 accepts unprocessed image data from the image buffer block 18 and computes an average scene color coordinate, called aveIll, as described below. A compute Bv block 44 accepts photographic information from the control processor 20 and determines the scene brightness value, called Bv, as described below. A determine scene illuminant block 46 accepts scene color information from the compute aveIll block 42 and scene brightness information from the compute Bv block 44. The scene illuminant is classified as one of a plurality of predefined illuminant types. A compute white balance block 48 accepts the illuminant classification type and determines the white balance gains. The final step is to apply the appropriate white balance gains to the linear RGB image data.

Figure 4:
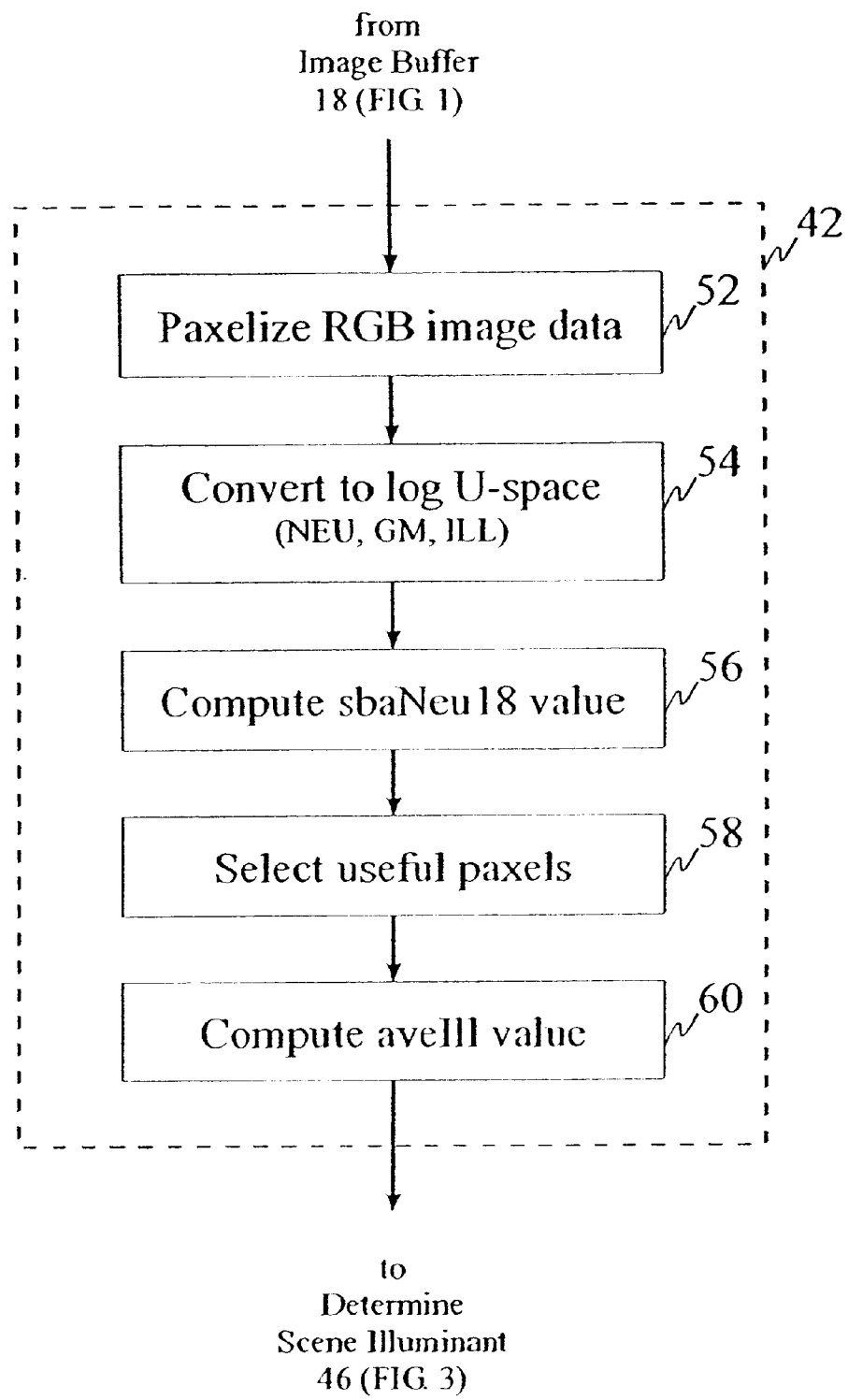
FIG. 4 shows in more detail a block diagram of block 42 in FIG. 3.

Referring to FIG. 4, the compute aveIll block 42 is described in greater detail. A paxelize RGB image data block 52 creates a low resolution version of the image by averaging the available red, green, and blue values in an array of pixel blocks, called paxels. The result is a 24×36 array of paxels which cover the central portion of the original image, such that each paxel has an average red, green, and blue value. The paxelized RGB averages are then passed to a convert to log U-space block 54 in which a sequence of transformations is applied. For each paxel, the linear RGB data values (linR, linG, linB) are converted to log RGB values. In the case of 12-bit linear data, which covers the range from 0 to 4095, the log RGB values are computed as follows:

$$logR = Round(1000*LOG_{10}(1+linR))$$

$$logG = Round(1000*LOG_{10}(1+linG))$$

$$logB = Round(1000*LOG_{10}(1+linB))$$

yielding another triplet of 12-bit integers. The log RGB values are then converted into log U-space color coordinates as follows:

$$NEU = (logR+logG+logB)/3$$

$$GM = (-logR+2*logG-logB)/4$$

$$ILL = (-logR+logB)/2$$

The result is a log U-space triplet (NEU, GM, ILL) for each paxel.

The next value to be computed is called sbaNeu18 which is an estimate of the NEU value of an 18% gray patch if one were present in the image. The value sbaNeu18 is determined (in block 56) from two intermediate neutral values which are now described in detail. To find the first intermediate value, the 24×36 paxelized image is divided into four horizontal strips of six rows each. In each horizontal strip the maximum NEU value (MN) is found and noted. Labeling the MN values 1 to 4 from top to bottom, we can express a composite average, called HWA (horizontal weighted average) as follows:

$$HWA = (1*MN_1+4*MN_2+4*MN_3+3*MN_4)/12$$

To find the second intermediate value, the original 24×36 array of paxels is used to define edge paxels. For each paxel having a 3×3 neighborhood of paxels, find the maximum NEU value (MAX) and the minimum NEU value (MIN). If (MAX−MIN) exceeds a specified threshold value (e.g. the value 240 works well) the paxel is called an edge paxel. Each edge paxel receives a weight wgt(i,j) (from a gaussian distribution) depending on its location:

$$wgt(i,j) = 1 + 3*\exp\left[-\frac{1}{2}\left(\frac{x_j^2}{\sigma_x^2} + \frac{y_i^2}{\sigma_y^2}\right)\right]$$

where i and j are the indices of the paxel's location in the array and where $$x_j = j - \frac{Ncol-1}{2} \qquad y_i = i - \frac{3}{5}*Nrow$$

and $$\sigma_x = \left(\frac{Ncol}{4}\right) \qquad \sigma_y = \left(\frac{Nrow}{4}\right)$$

and where Ncol is 36 and Nrow is 24.

The weighted average of the NEU values from edge paxels is called GWA (gaussian weighted average). Using the values HWA and GWA, sbaNeu18 can be computed:

$$sbaNeu18 = 0.35*HWA+0.65*GWA-0.3324$$

A select useful paxels block 58 accepts the paxelized image and the sbaNeu18 value from which it determines which paxels are useful to classifying the scene illuminant. Any paxel having a NEU value between sbaNeu18 and (sbaNeu18+700) is considered useful. These paxels have an estimated average scene reflectance falling in the range between 18% and 90%. In block 60, the average value aveIll is found by averaging the ILL coordinate of those paxels identified as useful in block 58.

Referring to block 44 in FIG. 3, photographic information is used to compute the scene brightness value Bv. Specifically, the photographic data is the aperture setting (f#), the shutter time (t), and the exposure index (ISO). From these three values, Bv can be computed as follows:

$$B_v = T_v + A_v - S_v$$

where $$T_V = \log_2\left(\frac{1}{t}\right)$$

$$S_V = \log_2\left(\frac{ISO}{\pi}\right)$$

and $$A_V = \log_2(f\#^2)$$

Figure 5:
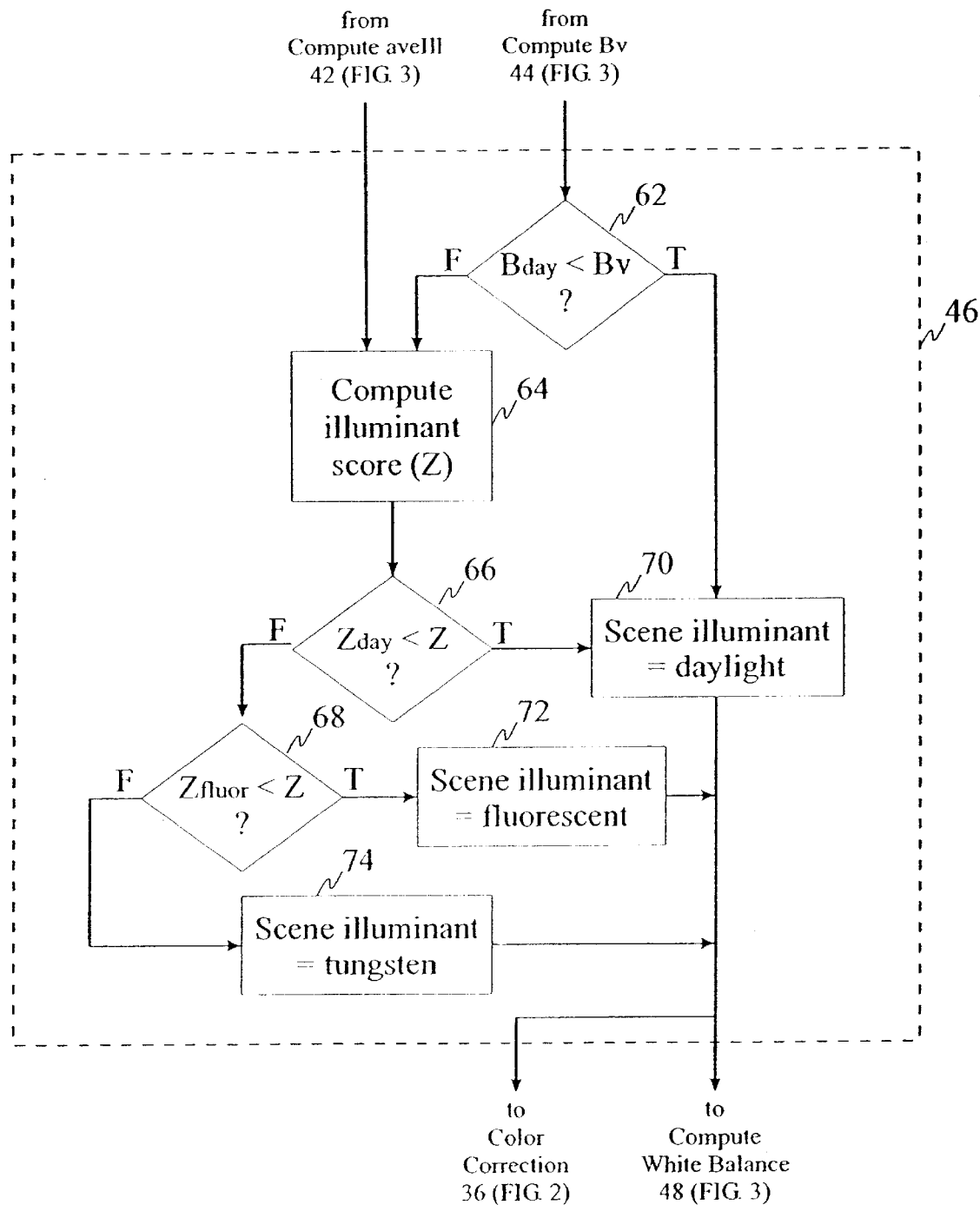
FIG. 5 shows in more detail a block diagram of block 46 in FIG. 3.

Using the two values, Bv and aveIll, as inputs, block 46 classifies the scene illuminant as one of a plurality of illuminant types. The preferred embodiment uses just three types, daylight, fluorescent, and tungsten. Referring to FIG. 5, the determine scene illuminant block is described in greater detail. A decision block 62 tests to see if Bv is greater than a threshold Bday (a typical value of Bday is 5). If the inequality of block 62 is true (T), the scene illuminant is classified as daylight in block 70. If the inequality is false (F), an illuminant score (Z) is computed in block 64 using the two values Bv and aveIll as follows:

$$Z = aveIll + 25*B_v$$

A decision block 66 tests to see if Z is greater than a threshold Zday (a typical value for Zday is 20). If the inequality of block 66 is true, the scene illuminant is classified as daylight in block 70. If the inequality is false, a decision block 68 tests to see if Z is greater than a threshold Zfluor (a typical value for Zfluor is −170). If the inequality of block 68 is true, the scene illuminant is classified as fluorescent in block 72. If the inequality is false, the scene illuminant is classified as tungsten in block 74.

Referring to FIG. 3, the compute white balance block 48 determines the proper RGB white balance gains, as a function of the scene illuminant classification, and applies those gains to the unprocessed image data received from image buffer block 18. The determination of correct white balance gains for each illuminant category is an empirical process. Beginning with the collection of a large number of images that contain an appropriate color test chart, including specifically an 18% reflectance gray patch, one manually determines the color channel gains needed to achieve a perfect white balance correct of the 18% gray patch. These color channel gains are then used to determine, by conventional least-squares function fitting, the coefficients in the following two white balance correction curves:

$$ILL_{wb} = B_1*Bv + B_2*aveIll + B_3$$

$$GM_{wb} = C_1*Bv + C_2*aveIll + C_3$$

where ILLwb and GMwb are the computed U-space color chromaticity coordinates of the 18% gray patch. The values ILLwb and GMwb can then be used to determine the corresponding white balance gains as disclosed in commonly-assigned U.S. Pat. No. 6,243,133 (Spaulding et al.). Depending on the particular camera system, the least-squares methodology can indicate that a single value of ILLwb and of GMwb is adequate to represent the entire illuminant category (i.e. $B_1=0$, $B_2=0$, $C_1=0$, and $C_2=0$). In other cases, all coefficients are required to be non-zero.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 2 input section
4 interpolation and recording
10 section-exposure section
12 image sensor
13 color filter array
14 output diode
16 A/D converter
18 image buffer
20 control processor
22 digital signal processor
24 removable memory card
26 connector
28 processing buffer
30 display panel
32 white balance block
34 color interpolation block
36 color correction block
42 compute aveIll block
44 compute Bv block
46 determine scene illuminant block
48 compute white balance block
52 paxelize RGB image data block
54 convert to log U-space block
56 compute sbaNeu18 value block
58 select useful paxels block
60 compute aveIll value block
62 decision block
64 compute illuminant score block
66 decision block
68 decision block
70 daylight scene block
72 fluorescent scene block
74 tungsten scene block

What is claimed is:

1. A white balance correction method for a digital imaging device, comprising:
    (a) determining a scene illuminant type from a scene brightness and one or more color coordinate values;
    (b) determining a white balance parameter value responsive to the scene illuminant type, the scene brightness, and one or more color coordinate values;
    (c) providing at least one white balance correction curve; and
    (d) determining the white balance correction from the white balance parameter value and at least one white balance correction curve for the determined scene illuminant type; and
    (e) wherein the white balance parameter value is defined by $$s = A_1 \times B_v + A_2 \times aveill + A_3$$

where $B_v$ is the scene brightness, aveill is a color coordinate value, and $A_1$, $A_2$, and $A_3$ are coefficient responsive to the scene illuminant type.

2. The method of claim 1 where the digital imaging device is a digital camera.

3. The method of claim 1 where the scene illuminant types are daylight, flash, tungsten, and fluorescent.

4. A computer storage product having at least one computer storage medium having instructions stored therein causing one or more computers to perform the method of claim 1.

5. A white balance correction method for a digital imaging device, comprising:
    (a) determining a scene illuminant type from a scene brightness and one or more color coordinate values;
    (b) determining a white balance parameter value responsive to the scene illuminant type, the scene brightness, and one or more color coordinate values;
    (c) providing at least one white balance correction curve;
    (d) determining the white balance correction from the white balance parameter value and at least one white balance correction curve for the determined scene illuminant type; and (e) wherein the white balance correction curve is defined by $$c = B_1 \times B_v + B_2 \times aveill + B_3$$

where $B_1$, $B_2$, and $B_3$ are coefficients responsive to the scene illuminant type.

6. A white balance correction method for a digital imaging device, comprising:

(a) determining a scene illuminant type from a scene brightness and one or more color coordinate values;

(b) determining a white balance parameter value responsive to the scene illuminant type, the scene brightness, and one or more color coordinate values;

(c) providing at least one white balance correction curve;

(d) determining the white balance correction from the white balance parameter value and at least one white balance correction curve for the determined scene illuminant type; and (e) wherein the white balance correction curve is defined by $$c = B_1 \times B_v + B_2 \times aveill + B_3$$

where $B_1$, $B_2$, and $B_3$ are coefficients responsive to the scene illuminant type and wherein the white balance parameter value is defined by $$s = A_1 \times B_v + A_2 \times aveill + A_3$$

where $B_v$ is the scene brightness, aveill is a color coordinate value, and $A_1$, $A_2$, and $A_3$ are coefficient responsive to the scene illuminant type.

7. The method of claim 6 where the scene illuminant types are daylight, flash, tungsten, and fluorescent.

\* \* \* \* \*